United States Patent [19]

Herring

[11] 4,250,769
[45] Feb. 17, 1981

[54] PIVOTED ADJUSTABLE LEVER WITH GRAB LINK

[76] Inventor: Gerald E. Herring, 808 Valerie, Pasadena, Tex. 77502

[21] Appl. No.: 925,233

[22] Filed: Jun. 17, 1978

[51] Int. Cl.³ .............................. G05G 1/04; B66F 3/00
[52] U.S. Cl. ........................................ 74/525; 254/129
[58] Field of Search ................. 74/519, 522, 523, 525; 254/30, 129, 130

[56] References Cited

U.S. PATENT DOCUMENTS

| 124,721 | 3/1872 | Clement | 74/525 X |
|---|---|---|---|
| 186,368 | 1/1877 | Ross | 254/129 |
| 266,195 | 10/1882 | Phillips | 254/130 X |
| 339,590 | 4/1886 | Springer | 254/130 X |
| 564,228 | 7/1896 | Sparling | 74/525 X |
| 593,063 | 11/1897 | Whitney | 254/129 X |
| 629,461 | 7/1899 | Nichols | 74/522 |
| 855,626 | 6/1907 | Furru | 74/522 |
| 868,952 | 2/1907 | White | 254/130 |
| 1,344,128 | 6/1920 | Griffithsiffiths | 74/519 |
| 1,426,068 | 8/1922 | Howe | 254/130 |
| 1,432,590 | 10/1922 | Caldwell | 254/130 |
| 1,618,785 | 2/1927 | Sooy | 74/522 |
| 3,048,368 | 8/1962 | Linabery | 254/130 |

Primary Examiner—Samuel Scott
Assistant Examiner—Randall L. Green
Attorney, Agent, or Firm—Gilbert L. Wells

[57] ABSTRACT

An adjustable hand lever having a vertically adjustable tripod base, an adjustable fulcrum point and a grab link at the working end of the lever. The grab link accomodates and makes adjustable linked working chains.

5 Claims, 3 Drawing Figures

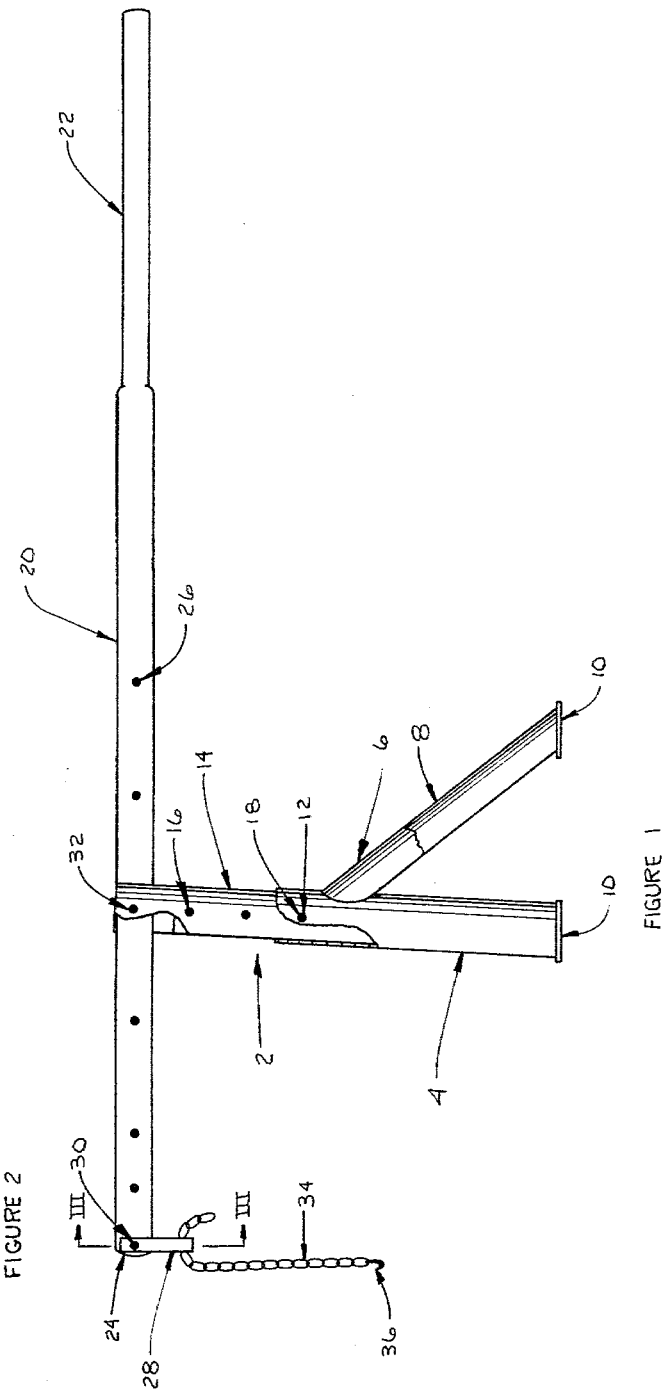

PIVOTED ADJUSTABLE LEVER WITH GRAB LINK

BACKGROUND OF THE INVENTION

The field of the invention is machine elements and mechanisms and the invention is particularly concerned with adjustable hand levers. The state of the art may be ascertained by reference to U.S. Pat. Nos. 124,721; 262,519; 445,558 and 750,287.

There is a need in the field of hand operated levers for:
1. concrete foundation form pulling;
2. counterweight lifting from a forklift;
3. crate and box turnover and flipping;
4. demolishing, prying and large nail pulling
5. drainage gate lifting;
6. elevator installation;
7. fence post extraction;
8. heavy object lifting such as walk-in coolers and freezers, auto engines, auto transmissions, castings, valves and computers;
9. longshore hook-up of beams and bundle pipe;
10. manhole cover lifting;
11. metal fabrication lifting and alignment;
12. oil field lifting;
13. pipe line lifting;
14. porch, step and sidewalk leveling;
15. railroad tie lifting;
16. safe moving;
17. sign post extraction;
18. tent stake pulling;
19. timber lifting and rolling;
20. trailer tongue lifting;
21. tree root and stump extraction;
22. buried utility pipe extraction;
23. water well pipe extraction; and
24. wood floor removal.

In order to carry out the above functions, it is necessary for the adjustable hand lever to be light in weight, vertically adjustable, variable in the force applied, easily dismantled and reassembled and low in cost. None of the prior art adjustable hand levers meet these requirements.

SUMMARY OF THE INVENTION

Having in mind the limitations of the prior art and the needs of the field of the invention, the present invention was conceived.

The present invention comprises an adjustable hand lever, an adjustable fulcrum and a grab link at the working end of the lever. The fulcrum consists of three pieces of pipe welded together as a tripod with each leg having square pads which give the unit a firm footing and prevent it from sinking and/or cutting into the surface on which it stands. (In the case of soft dirt or sand, 2 inch lumber can be placed under the feet.) The primary leg is the strongest leg of the tripod and leans inward about 5 degrees from a true vertical. The lean is for working room and stability. The primary leg has a hole near the top which holds a detent pin and allows vertical adjustment of the telescoping pivot arm which telescopes inside the primary leg. The lever arm can be a ¾"×2" flat bar turned on edge with holes drilled and spaced to provide adjustments for more or less leverage, and more or less travel distance through which the lever moves as the nature of the work dictates. The adjustment of the lever arm in the telescoping pivot arm is accomplished by another detent pin passing through holes on each side of a slot in the pivot arm and sliding the selected hole in the lever arm into position. The lever arm has one end machined round which under normal conditions is the handle but under difficult lifting situations becomes the place for an extension pipe to be placed over the handle to add length to the lever. The grab link is "U" shaped to fit the working end of the lever. It can be machined to function as an easily adjustable slide through grab link for a 5/16"×1-¼" link chain. The end or ends of a chain are positioned so that a number of tools can be attached to the working end of the lever arm for different lifting jobs. These tools can be the chain itself, hooks, grab attachments, tongs, choke wires, rope or web slings.

BRIEF DESCRIPTION OF THE DRAWINGS

The present invention may best be described by reference to the appended drawing, wherein:

FIG. 1 is a side view of the present invention with portions of the fulcrum partially in section;

FIG. 2 is a perspective view of a detail of the working end of the lever in the present invention;

FIG. 3 is a detailed view along the lines III—III of the grab link of FIG. 1.

DESCRIPTION OF THE PREFERRED EMBODIMENT

Figure 4:
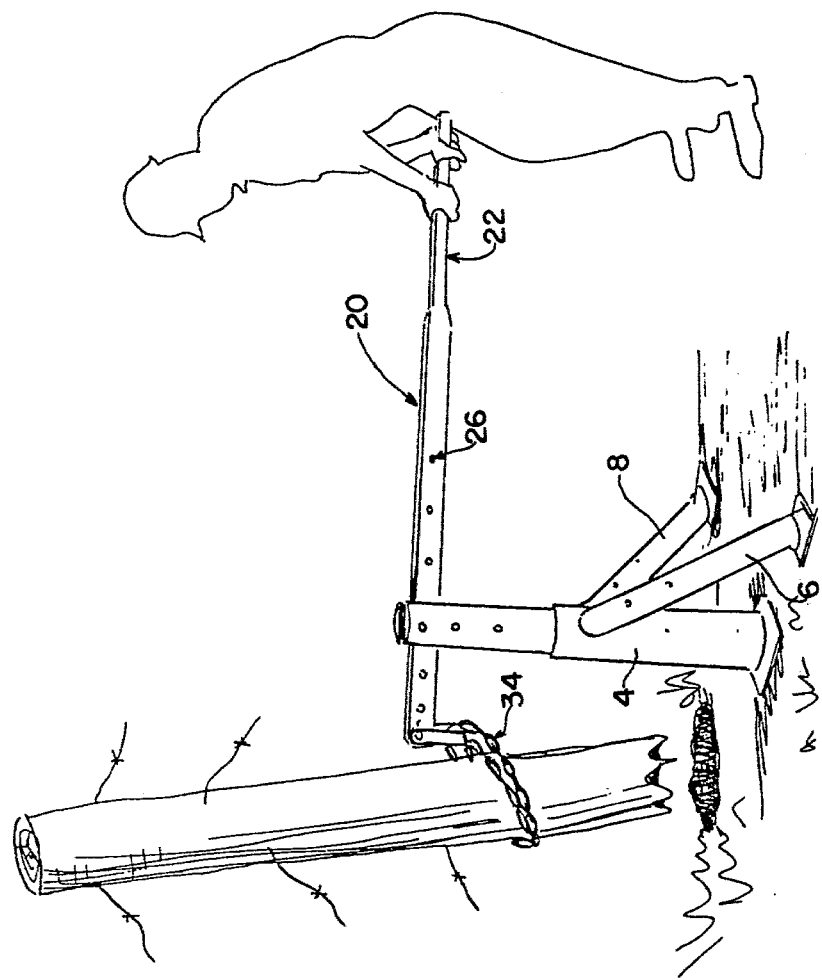
FIG. 4 is a perspective view showing the three legs of the tripod and the invention in use.

With particular reference to FIG. 1, the fulcrum 2 is shown having a primary leg 4 and two stabilizing legs 6 and 8. Each of the legs have square metal pads 10 secured to the bottom thereof to distribute the weight of the fulcrum over a greater base area.

Primary leg 4 is tilted about 5 degrees to the vertical and has at least one detent hole 12 passing through both sides. Telescoping pivot arm 14 telescopes inside primary leg 4 and is vertically adjustable by a plurality of holes 16 therethrough. The pivot arm 14 is maintained at the selected elevation by a pin 18 passing through hole 12 and one of the holes 16.

The lever arm 20 has a handle portion 22, a working end 24 and a plurality of longitudinally spaced holes 26. A snap grab link 28 is connected to the working end 24 by a pin or bolt 30 passing through the last hole 26 of the lever arm but the snap link may be positioned through any hole 26 of the lever arm. The lever arm is pivoted on the pivot arm 14 by inserting a pin 32 through holes 16 and 26. A chain 34 is secured at one end by the grab link 28 and has means for attachment 36, such as a hook or shackle at the other end.

The grab link 28 is shown in detail in FIGS. 2 and 3. The grab link has a "U" shape and has a bolt hole 42 used to attach it to the working end 24 of lever 20. Inside the "U" the machining which was accomplished looks similar to a key hole 40, having a large upper portion and below it a vertical slot which is the grab portion of 28. It grabs as shown in FIGS. 2 and 3. A single link of a chain fits into the key hole slot leaving both ends of the chain dangling but very strongly attached to the grab link 28. Adjustment is accomplished by lifting the link from the key hole slot portion to the large portion through which the chain easily slips. Upon making an adjustment on the chain the lever is moved, forcing the chain to pull up or lift. The load is either wedged or blocked in place until another adjustment can be made on the chain.

The end or ends of the chain become the place for the attachment of hooks 36, grab attachments, tongs, choke wires, rope or web slings.

I claim:
1. A handoperated lifting apparatus comprising:
   (a) a lever having a working end and a handle with means for longitudinal adjustment of a pivot point;
   (b) a fulcrum having a tripod base with means for vertical adjustment of said pivot point; and
   (c) means for adjusting the length of a linked chain and securing the adjusted length of chain to said working end,
   wherein said means for adjusting the length of a linked chain is a U-shaped grab hook with an inner surface having a keyhole configuration which includes an oval upper portion and a vertical slot, said vertical slot adapted to receive a link of chain.
2. The apparatus of claim 1, wherein said means for longitudinal adjustment is a plurality of longitudinally spaced holes in said lever.
3. The apparatus of claim 2, wherein said means for vertical adjustment comprises a first tubular primary leg of said tripod with at least one hole therethrough and a telescoping tubular pivot arm therein having a plurality of vertically spaced holes therein.
4. The apparatus of claim 3, wherein said primary leg is tilted about 5 degrees from the vertical.
5. The apparatus of claim 4, wherein said chain has means for attaching objects at one end.

* * * * *